United States Patent
Whdan

(10) Patent No.: US 12,399,936 B2
(45) Date of Patent: Aug. 26, 2025

(54) SYSTEM AND METHOD FOR DETERMINING PERFORMANCE OF A CELLULAR NETWORK

(71) Applicant: DISH Wireless L.L.C., Englewood, CO (US)

(72) Inventor: Ahmed Awwad Whdan, Centennial, CO (US)

(73) Assignee: DISH Wireless L.L.C., Englewood, CO (US)

( * ) Notice: Subject to any disclaimer, the term of this patent is extended or adjusted under 35 U.S.C. 154(b) by 17 days.

(21) Appl. No.: 18/492,966

(22) Filed: Oct. 24, 2023

(65) Prior Publication Data

US 2025/0131039 A1   Apr. 24, 2025

(51) Int. Cl.
| | | |
|---|---|---|
| *G06F 17/00* | (2019.01) | |
| *G06F 7/00* | (2006.01) | |
| *G06F 16/901* | (2019.01) | |
| *H04W 24/08* | (2009.01) | |

(52) U.S. Cl.
CPC ........ *G06F 16/9024* (2019.01); *H04W 24/08* (2013.01)

(58) Field of Classification Search
CPC ............................ G06F 16/9024; H04W 24/08
USPC ....................................................... 707/722
See application file for complete search history.

(56) References Cited

U.S. PATENT DOCUMENTS

| | | | | |
|---|---|---|---|---|
| 2011/0201279 A1* | 8/2011 | Suzuki | ................. | H04W 24/10 455/67.11 |
| 2012/0315890 A1* | 12/2012 | Suzuki | ................. | H04W 24/10 455/422.1 |
| 2014/0269388 A1* | 9/2014 | Kuru | .................... | H04W 48/18 370/252 |
| 2014/0362750 A1* | 12/2014 | Song | ................ | H04W 36/0072 370/311 |

* cited by examiner

*Primary Examiner* — Pavan Mamillapalli
(74) *Attorney, Agent, or Firm* — Baker Botts L.L.P.

(57) ABSTRACT

A database stores data relating to a plurality of performance indicators associated with performance of a cellular network as experienced by a first UE. The data includes data relating to a first set of the performance indicators that indicate a quality of cellular coverage associated with the cellular network as experienced by the first UE and data relating to a second set of the performance indicators that indicate whether the first UE was operating in an indoor environment. It is determined based on the second set of performance indicators whether the UE was operating in an indoor environment for a particular time period. If yes, a portion of the data relating to the first set of performance indicators collected during the particular time period is discarded and the remaining data is plotted on a graph to represent a quality of the cellular network.

14 Claims, 2 Drawing Sheets

SYSTEM AND METHOD FOR DETERMINING PERFORMANCE OF A CELLULAR NETWORK

TECHNICAL FIELD

The present disclosure relates generally to wireless communications, and more specifically to a system and method for determining performance of a cellular network.

BACKGROUND

Performance of a cellular network is often monitored and measured by cellular network operators to understand how well the network is performing in particular areas of cell coverage and to determine any problems with the cellular network. A network operator may also monitor performance of a cellular network operated by another network operator for network performance benchmarking which includes determining how the operator's network compares to a competitor's network. Decisions are made with regarding to deployment of new cell sites, placement of cell sites and upgradation of existing cell sites based on network performance data collected for a particular cellular network.

SUMMARY

The system and methods implemented by the system as disclosed in the present disclosure provide an intelligent technique to determine performance of a cellular network accurately. The disclosed system and methods provide several practical applications and technical advantages. For example, the disclosed system and method provide the practical application of determining a portion of the performance data relating to the performance of a cellular network collected by a UE that accurately represents the quality of a cellular network coverage associated with the cellular network. As described in embodiments of the present disclosure, a UE connected to the cellular network is used to collect data relating to a plurality of performance indicators. The performance indicators include network quality indicators that indicate the quality of network coverage experienced by the UE and indoor/outdoor indicators that indicate whether the UE was in an indoor environment when collecting at least a portion of the data relating to the network quality indicators. Based on one or more of the indoor/outdoor indicators, a performance server determines one or more time periods during which the UE was operating in an indoor environment. Upon determining that the UE was operating in and indoor environment during one or more time periods, the performance server discards data relating to the network quality indicators that was collected by the UE during those time periods when the UE was operating in indoor environments. The performance server then generates a graph by plotting a remaining portion of the data relating to the network quality indicators to represent the quality of network coverage associated with the cellular network.

As described in this disclosure, network performance data collected by the UE when operating in an indoor environment is not a good indicator of the true performance of the cellular network. Thus, decisions taken with regard to deployment, relocation and/or upgradation of cell sites based on such performance data may lead to reduced and/or sub-optimal network performance. By discarding network performance data collected by the UE when operating in an indoor environment and determining the quality of the cellular network based only on data collected by the UE when operating in outdoor environments, the disclosed system and method cause right decisions to be made with regard to deployment, relocation and/or upgradation of cell sites leading to improved and/or optimal network performance. Further, in some cases, incorrect deployment decisions made based on inaccurate network performance data may lead to base stations having to handle a large amount of network load leading to overloading of computing systems that implement or control portions of the base station. By determining accurate network performance data, the disclosed system and method cause the deployment decisions to be made based on the accurate network performance data leading to deployment of sufficient network and computing resources at particular cell sites. This may improve the efficiency and performance of computing systems that implement and/or control the base stations.

Thus, the disclosed system and methods generally improve the technology related to cellular networks and communication using such networks.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
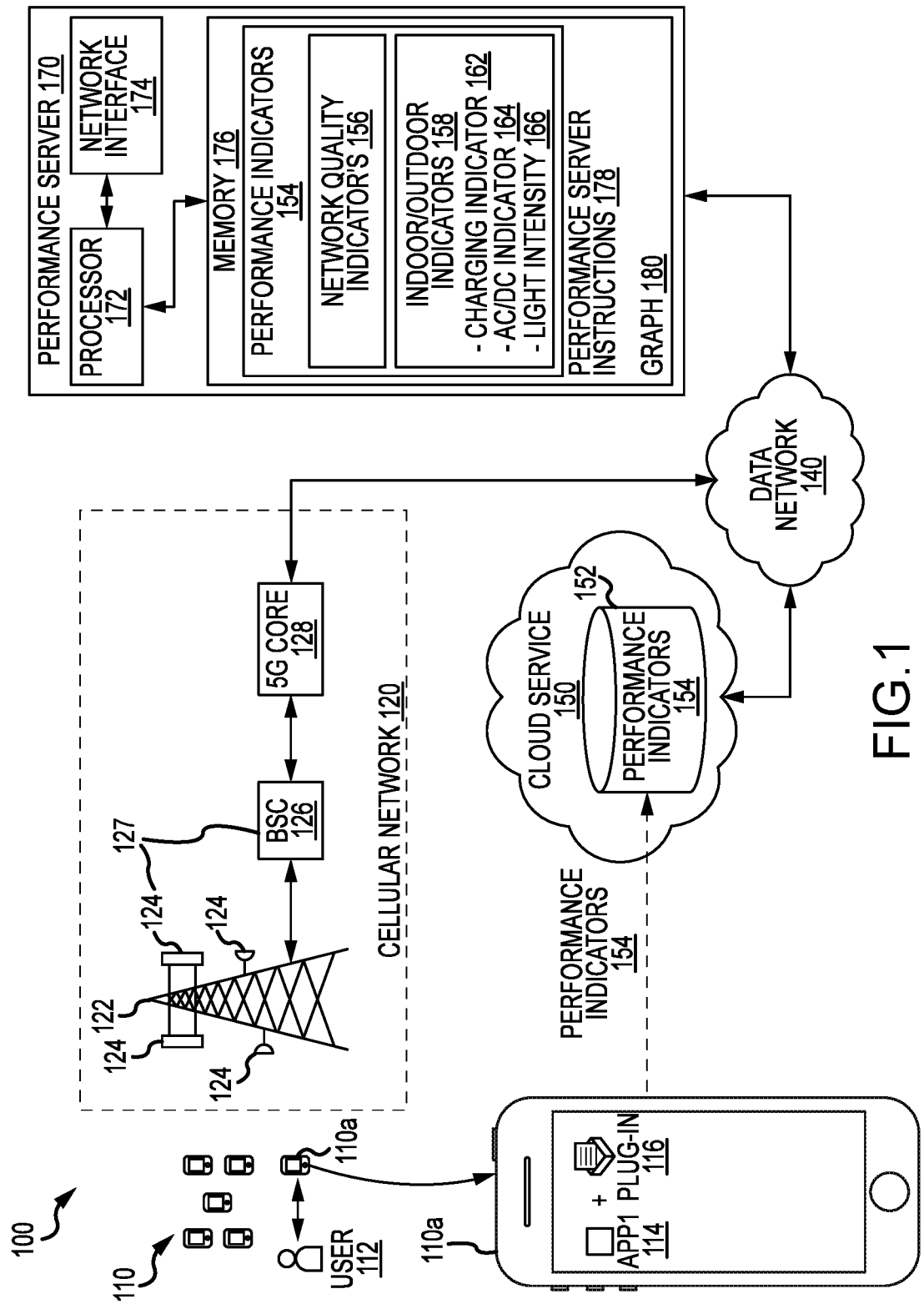
FIG. 1 illustrates a system in accordance with embodiments of the present disclosure.

FIG. 1 illustrates an example system 100, in accordance with embodiments of the present disclosure. As shown in FIG. 1, system 100 may include a plurality of user equipment (UEs) 110, a cellular network 120, a cloud service 150, and a performance server 170, each connected to a data network 140. The cellular network 120 may includes a base station tower 122, a base station controller (BSC) 126, and a $5^{th}$ Generation (5G) Core 128. Collectively, base station tower 122 and base station controller 126 may be referred to as a base station 127. A base station tower 122, often also referred to as a cell tower, is a fixed radio transceiver that is capable of sending and receiving wireless signals and is the main communication point for UEs 110. It may be noted that the terms "base station tower", "cell tower" may be used interchangeably throughout this disclosure. BSC 126 is a network element that typically controls and monitors several base station towers 122 and provides an interface between a base station tower 122 and a mobile switching center (not shown). In the context of $5^{th}$ Generation (5G) New Radio (NR), base station 127 may be referred to as a gNodeB or gNB. It may be noted that the terms "base station" and "gNodeB" may be used interchangeably throughout this disclosure. Base station 127 may provide the UE 110 access to the 5G core 128 which in turn provides the UE access to the data network 140. For example, base station 127 may be part of a 5G NR cellular network. In this context, base station 127 may be a gNodeB. Base station 127 may serve a particular geographical area, with other base stations serving neighboring geographical areas that at least partially overlap. Services provided by the cellular network 120 can include telephone calls, network access (e.g., access to data network 140), data reporting, text messaging services, etc. Such services may generally rely on packetized data being exchanged between the UE 110 and the base station 127.

While the cellular network 120 is shown to include a single base station 127, a person having ordinary skill in the art may appreciate that the cellular network 120 may include a plurality of base stations 127 deployed over a large region such as a city, county, state or country.

While cellular network 120 is described in the context of a 5G NR radio network that uses gNodeBs as base stations 127, the embodiments detailed herein can be applicable to other types of cellular networks, such as a 4G Long Term Evolution (LTE) cellular network, that uses eNodeBs in place of gNodeBs. In one or more embodiments, cellular network 120 operates according to the 5G NR radio access technology (RAT). In other embodiments, a different RAT may be used, such as 3G, 4G Long Term Evolution (LTE), or some other RAT. In some other embodiments, as shown in FIG. 1, the 5G network may use a 5G core 128. In some embodiments, a 5G network may use an evolved packet core (EPC) instead of or in addition to the 5G core 128.

UE 110 can be one of various forms of wireless devices that are capable of communication according to the radio access technology (RAT) of the cellular network 120. For instance, UE 110 can be a smartphone, wireless modem, cellular phone, laptop computer, wireless access point (APs), etc. Each UE 110 may be operated by one or more users 112.

The data network 140, in general, may be a wide area network (WAN), a personal area network (PAN), a cellular network, or any other technology that allows devices to communicate electronically with other devices. In one or more embodiments, the data network 140 may be the Internet.

In one or more embodiments, each of the performance server 170 may be implemented by a computing device running one or more software applications. For example, the performance server 170 may be representative of a computing system hosting software applications that may be installed and run locally or may be used to access software applications running on the performance server 170. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, the performance server 170 may be representative of a server running one or more software applications to implement respective functionality as described below. In certain embodiments, the performance server 170 may run a thin client software application where the processing is directed by the thin client but largely performed by a central entity such as a central server (not shown).

Performance of a cellular network (e.g., cellular network 120) is often monitored and measured by cellular network operators to understand how well the network is performing in particular areas of cell coverage and to determine any problems with the cellular network. A network operator may also monitor performance of a cellular network operated by another network operator for network performance benchmarking which includes determining how the operator's network compares to a competitor's network. Decisions are made with regarding to deployment of new cell sites, placement of cell sites and upgradation of existing cell sites based on network performance data collected for a particular cellular network. It is important that the collected network performance data accurately represents a quality of cell coverage so that the right decisions may be made with regarding to deployment, placement and upgradation of cell cites and so that sub-par network performance caused by incorrect deployment decisions that are based on inaccurate performance data is avoided.

Embodiments of the present disclosure describe techniques for accurately determining performance associated with a cellular network.

A UE 110a (e.g., a smartphone) that is connected to a particular cellular network 120 may be used to collect data associated with a plurality of performance indicators 154, wherein each performance indicator 154 indicates performance of the cellular network 120 directly or indirectly. In one embodiment, a software plug-in 116 is embedded into a mobile application 114 installed at the UE 110a (e.g., a smartphone). The software plug-in 116 is configured to collect data relating to a plurality of performance indicators 154 when the mobile application 114 is active at the UE 110a. For example, the software plug-in 116 initiates collection of performance data related to the performance indicators 154 when the mobile application 114 is opened at the UE 110 and continues to collect performance data while the mobile application 114 is open and is being actively used, for example, by a user 112. The software plug-in 116 may be configured to collect performance data relating a plurality of performance indicators 154 that directly indicate quality of cell coverage associated with the cellular network 120. For example, the performance indicators 154 may include one or more network quality indicators 156 including, but not limited to, Reference Signal Received Power (RSRP), Reference Signal Received Quality (RSRQ), Signal-to-Noise and Interference Ratio (SNIR), downlink speed, and uplink speed.

In some cases, the performance data (e.g., relating to network quality indicators 156) collected by the UE 110a may not accurately represent the quality of cellular coverage associated with the cellular network 120. For example, cellular coverage is generally weaker in an indoor environment (e.g., inside a building, vehicle, etc.) where the cellular signal (e.g., from the cell tower 122) needs to traverse walls and other obstructions degrading signal quality and resulting in lower network performance in the indoor environment, as compared to outdoors where there are generally lesser obstructions between the cellular signal from the cell tower 122 and the UE 110a. Thus, lower performance is expected in an indoor environment and performance data collected when the UE 110a is operating in an indoor environment is not a good indicator of network performance. Accordingly, data relating to one or more network quality indicators 156 collected by the UE 110a when located in an indoor environment is not a reliable indicator of the actual quality of cellphone coverage at that particular location of the UE 104a. This inaccurate performance data may lead to incorrect decisions being made with regard to deployment, relocation and/or upgradation of cell towers 122. It may be noted that the term "indoor environment" in the context of the present disclosure refers to any area that is at least partially enclosed in an enclosed structure of some kind and where radio signals from a cell tower 122 are at least partially obstructed by the enclosed structure.

As described below in further detail, embodiments of the present disclosure describe techniques that determine whether a UE 110a was in an indoor environment during certain time periods and discard performance data collected during such time periods. After discarding performance data collected during time periods when the UE 110a was indoors, the remaining performance data is used to determine the quality of the network coverage experienced by the UE 110a.

For example, in an additional or alternative embodiment, the software plug-in 116 may be configured to collect performance data relating a plurality of performance indicators 154 that indirectly indicate quality of cell coverage associated with the cellular network 120. For example, the performance indicators 154 may include one or more indoor/outdoor indicators 158 including, but not limited to, charging indicator 162, Alternative Current (AC)/Direct Current (DC) indicator 164, and light intensity 166. Each of the indicators 162, 164, 166 that are part of the indoor/outdoor indicators 158 indicate, at least in part, whether the UE 110a was in an indoor environment or an outdoor environment while data relating to these indicators 162, 164, 166 was collected.

It may be noted that the network quality indicators 156 and the indoor/outdoor indicators 158 listed above is not an exhaustive list of performance indicators 154 collected by the UE 110a. For example, the UE 110a may be configured to collect data associated to one or more additional performance indicators 154 including, but not limited to, Base Station Identity Code (BSIC) that uniquely identifies the base station 127, Band information indicating whether the UE 110a is connected to a cellular network or a WiFi network, Bandwidth of the connection between the UE 110a and the base station 127, CELL ID which identifies a cell associated with the base station 127, Mobile Country Code (MCC) and Mobile Network Code (MNC) which in combination identifies a mobile network operator of the cellular network 120, and Physical Cell Identifier (PCI) which identifies a cell in 5G NR.

It may be noted that while embodiments of the present disclosure are discussed with reference to processing network performance data collected by a single UE 110a for a single cellular network 120, a person having ordinary skill in the art may appreciate that the disclosed embodiments may be used to process network performance data collected by a plurality of UEs 110 for a plurality of cellular networks. For example, in one embodiment, a plurality of UEs 110 connected to the cellular network 120 may be used to collect data relating to one or more performance indicators 154 associated with the cellular network 120, wherein data collected by each UE 110 indicates the quality/performance of the cellular network 120 as experienced by the UE at a particular location of the UE. In an alternative of additional embodiments, UEs 110 may be used to collect performance data for a plurality of cellular networks. For example, a first set of the UEs 110 may be connected to a first cellular network operated by a first cellular network operator and a second set of the UEs may be connected to a second cellular network operated by a second cellular network operator. In this example, the first set of UEs 110 collect data relating to one or more performance indicators 154 associated with the first cellular network, and the second set of UEs 110 collect data relating to one or more performance indicates 154 associated with the second cellular network.

Each UE 110 that collects data relating to one or more performance indicators 154 for a particular cellular network 120 may be configured to store the collected data in a database 152 (e.g., SQL Database) that is connected to the data network 140. For example, UE 110a may be configured to store performance data relating to the performance indicators 154 in the database 152. In one embodiment, the database 152 may be hosted in a cloud service 150 and may be part of cloud storage provided by the cloud service 150.

The performance server 170 includes a processor 172, a memory 176, and a network interface 174. The performance server 170 may be configured as shown in FIG. 1 or in any other suitable configuration.

The processor 172 includes one or more processors operably coupled to the memory 176. The processor 172 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 172 may be a programmable logic device, a microcontroller, a microprocessor, or any suitable combination of the preceding. The processor 172 is communicatively coupled to and in signal communication with the memory 176. The one or more processors are configured to process data and may be implemented in hardware or software. For example, the processor 172 may be 8-bit, 16-bit, 32-bit, 64-bit or of any other suitable architecture. The processor 172 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., performance server instructions 178) to implement the performance server 170. In this way, processor 172 may be a special-purpose computer designed to implement the functions disclosed herein. In one or more embodiments, the performance server 170 is implemented using logic units, FPGAs, ASICs, DSPs, or any other suitable hardware. The performance server 170 is configured to operate as described with reference to FIG. 2. For example, the processor 172 may be configured to perform at least a portion of the method 200 as described in FIG. 2.

The memory 176 comprises a non-transitory computer-readable medium such as one or more disks, tape drives, or solid-state drives, and may be used as an over-flow data storage device, to store programs when such programs are selected for execution, and to store instructions and data that are read during program execution. The memory 176 may be volatile or non-volatile and may comprise a read-only memory (ROM), random-access memory (RAM), ternary content-addressable memory (TCAM), dynamic random-access memory (DRAM), and static random-access memory (SRAM).

The memory 176 is operable to store performance indicators 154 including network quality indicators 156 and indoor/outdoor indicators 158, graph 180, and performance server instructions 178. The performance server instructions 178 may include any suitable set of instructions, logic, rules, or code operable to execute the performance server 170.

The network interface 174 is configured to enable wired and/or wireless communications. The network interface 174 is configured to communicate data between the performance server 170 and other devices, systems, or domains (e.g., cloud service 150, cellular network 120 and UEs 110). For example, the network interface 174 may comprise a Wi-Fi interface, a LAN interface, a WAN interface, a modem, a switch, or a router. The processor 172 is configured to send and receive data using the network interface 174. The network interface 174 may be configured to use any suitable type of communication protocol as would be appreciated by one of ordinary skill in the art.

It may be noted that each UE 110, may be implemented similar to the performance server 170. For example, a UE 110 may include a processor and a memory storing instructions to implement the respective functionality of the UE 110 when executed by the processor.

Performance Server 170 may be configured to determine a quality of the cellular network 120 as experienced by a UE 110 (e.g., UE 110*a*) based on data related to performance indicators 154 collected by the UE 110. For example, performance server 170 may have access to the performance data relating to one or more performance indicators 154 collected using a plurality of UEs 110 such as UE 110*a*. In one embodiment, performance server 170 may (e.g., periodically or when needed) extract at least a portion of the data related to performance indicators 154 stored in the database 152 from the cloud service 150 and store locally in memory 176. For example, performance server 170 may extract performance data related to one or more performance indicators 154 collected by a particular UE 110*a* and store locally in memory 176. The data relating to the performance indicators 154 access from the database 152 and/or extracted from the database 152 may include data relating to network quality indicators 156 as well as indoor/outdoor indicators 158.

Performance server 170 may be configured to determine which portion of the data collected by the UE 110*a* was collected when the UE 110*a* was operating in an indoor environment. For example, performance server 170 may be configured to determine that the UE 110 was operating in an indoor environment for a given time period based on data collected by the UE 110 relating to the indoor/outdoor indicators during the time period. The performance server 170 may be configured to use data relating to one or more of the charging indicator 162, AC/DC indicator 164, and light intensity 166 to determine whether the UE 110*a* was in an indoor environment when the data relating to these indoor/outdoor indicators 158 was collected by the UE 110*a*.

In one embodiment, performance server 170 may be configured to determine that the UE 110 was operating in an indoor environment during a given time period based on data collected by the UE 110 relating to the charging indicator 162 during the given time period. The charging indicator 162 indicates whether the UE 110*a* was being actively charged at any given time instant. For example, during data collection, when the UE 110*a* is not being actively charged (e.g., not receiving electrical power) the charging indicator indicates "not charging". However, when the UE 110*a* is connected to a power source, the charging indicator 162 flips to indicate "charging" and remains in this state until the UE 110*a* is disconnected from the power source and stops received electrical power, in which case the charging indicator 162 flips back to "not charging". To determine whether the UE 110*a* was being charged during the given time period, the performance server 170 examines the state (e.g., charging or not charging) of the charging indicator 162 during the given time period. If the charging indicator 162 indicates "charging" during the given time period, the performance server 170 determines that the UE was being charged during the given time period. In response to determining that the UE 110 was being charged during the given time period, the performance server 170 determines that the UE 110*a* was operating in an indoor environment during the given time period. The idea here is that users generally charge their devices (e.g., smartphone, tablet computer, smartwatches etc.) in an indoor environment such as home and office. Thus, if a UE 110*a* is being charged, there is a good likelihood that the UE 110 is in an indoor environment.

In an additional or alternative embodiment, performance server 170 may be configured to determine that the UE 110 was operating in an indoor environment during a given time period based on data collected by the UE 110 relating to the charging indicator 162 and the AC/DC indicator 164 during the given time period. In this embodiment, the performance server 170 may be configured to determine whether the UE 110 was operating in an indoor environment based on a combination of data relating to the charging indicator 162 and the AC/DC indicator 164 collected during the given time period. For example, in addition to examining the state of the charging indicator 162 during the given time period, the performance server 170 also examines a state of the AC/DC indicator 164 during the given time period. The AC/DC indicator 164 indicates whether the UE 110 received AC power or DC power when charging during a given time period. For example, during data collection, when the UE 110*a* is actively being charged and is receiving AC power, the AC/DC indicator 164 is set to "AC" to indicate that the UE 110*a* is receiving AC power. On the other hand, when the UE 110*a* is receiving DC power, the AC/DC indicator 164 is set to "DC" to indicate that the UE 110*a* is receiving DC power. To determine whether the UE 110*a* was being operated in an indoor environment during the given time period, the performance server 170 checks the states of both the charging indicator 162 and AC/DC indicator during the given time period. In other words, the performance server 170 checks whether the UE 110*a* was being charged during the given time period, and if yes, checks whether the UE as receiving AC power or DC power. The performance server 170 determines that the UE 110*a* was being charged using AC power during the given time period when the charging indicator 162 is set to "charging" and the AC/DC indicator 164 is set to "AC" during the given time period. In response to determining that the UE 110*a* was being charged using AC power during the given time period, the performance server 170 determines that the UE 110*a* was operating in an indoor environment during the given time period. This embodiment is to account for those cases when the UE 110*a* is being charged in an outdoor environment and to avoid false positives in such cases. For example, users 112 often charge their devices using portable charging devices such as a power bank. In such cases, the charging indicator 162 alone is not a good indicator of whether the UE 110*a* was operating in an indoor environment. Portable charging devices typically provide DC power to a UE 110. On the other hand, power socket that are generally provided in indoor environments such as buildings provide AC power. Thus, whether the UE 110*a* is receiving AC power or DC power is a reasonably reliable indicator of whether the UE 110*a* is being charged in an indoor environment or an outdoor environment. In other words, when the UE 110*a* is being charged using AC power, there is a high likelihood that the UE 110*a* is in an indoor environment. Thus, determining whether the UE 110*a* was operating in an indoor environment based on a combination of the charging indicator 162 and AC/DC indicator 164 is more accurate that a determination based on charging indicator 162 alone.

In an additional or alternative embodiment, performance server 170 may be configured to determine that the UE 110 was operating in an indoor environment during a given time period based on data collected by the UE 110 relating to the light intensity 166 during the given time period. As described above, a light sensor associated with the UE 110a may be configured to measure the intensity of light in the vicinity of the UE 110a. The amount of light is usually lower in indoor environments as compared to outdoor environments during daytime. Thus, when the light intensity measured by the light sensor associated with the UE 110a is lower than a pre-configured threshold (e.g., during daytime), there is a good likelihood that the UE 110 is in an indoor environment. The performance server 170 may be configured to examine the light intensity 166 measured by the light sensor of the UE 110a (e.g., during daytime) and determines that the UE 110a was operating in an indoor environment during a given time period when the light intensity 166 is below the threshold during the given time period. In response to determining that the light intensity 166 is below the threshold during the given time period, the performance server 170 determines that the UE 110a was operating in an indoor environment during the given time period.

In one embodiment, the data relating to light intensity 166 may be combined with data relating to the charging indicator 162 and/or the AC/DC indicator 164 to raise accuracy associated with determining whether the UE 110a was operating in a indoor environment. For example, the performance server 170 may determine that the UE 110a was operating in an indoor environment during a given time period in response to determining that the charging indicator was set to "charging", the AC/DC indicator 164 was set to "AC", and the light intensity 166 was below the threshold.

As described above, performance data collected when the UE 110a is operating in an indoor environment is not a true indicator of network performance at a given location (e.g., geographical location) of the UE 110a where the data was collected. Thus, performance server 170 may be configured to discard data relating to the performance indicators 154 collected by the UE 110a while operating in indoor environments. For example, using the process described above, performance server 170 determines all those time periods when the UE 110a was operating in indoor environments, and discards data relating to the performance indicators 154 collected during all those time periods. In one embodiment, discarding data includes not considering the discarded data to determine quality of the cellular network 120. In one embodiment, in response to determining that the UE 110a was operating in an indoor environment during a given time period, the performance server 170 discards data relating to the network quality indicators 156 collected by the UE 110a during the given time period.

After discarding a portion of the data relating to network quality indicators 156 that was collected by the UE 110a when operating in indoor environments, performance server 170 may be configured to generate a graph 180 based on the remaining data relating to the network quality indicators 156. In one embodiment, the graph 180 plots an average value associated with one or more network quality indicators 156 to visually represent a quality of the cellular coverage associated with the cellular network 120 as experienced by the UE 110a. The performance server 170 may be configured to display the graph 180 on a display device to allow a user 112 to view the graph 180. In one embodiment, performance server 170 may be configured to determine an average values of one or more network quality indicators 156 collected by several UEs 110 connected to the cellular network 120, and plots the average values by region on the graph 180. This provides a better picture of the quality of network coverage associated with the cellular network 120 in different regions, for example, of a city, town, county and/or country. Similarly, the performance indicator may determine separate average values of the network quality indicators 156 collected by UEs 110 connected to different cellular networks, and separately plots the average quality indicators associated with the different cellular networks on the same graph 180. This allows for a comparative analysis different cellular networks. An example graph 180 may include the average values of one or more network quality indicators 156 plotted region wise on a map of a city, state or country. Other examples of the graph 180 may include, but are not limited to, bar graphs, pie charts, area charts, scatter plots, and line graphs.

In an alternative or additional embodiment, the performance server may be configured to determine whether the quality of the cellular network is acceptable in a particular region (e.g., neighborhood, city, town, county etc.) based on data relating to one or more network quality indicators 156 (e.g., after discarding data collected when the was in UE 110a indoor environments). For example, based on data relating to a particular network quality indicator 156 (e.g., RSRP) collected by the UE 110a in a particular neighborhood, the performance server 170 may determine whether an average RSRP over a given time period is below a threshold. If the average RSRP is below the threshold, the performance server 170 determines that the quality of the cellular network 120 in the neighborhood is not acceptable. This may cause the network operator of the cellular network 120 to decide to deploy one or more additional cell sites (e.g., cell towers 122) in the neighborhood to improve quality of cell coverage in the neighborhood.

Figure 2:
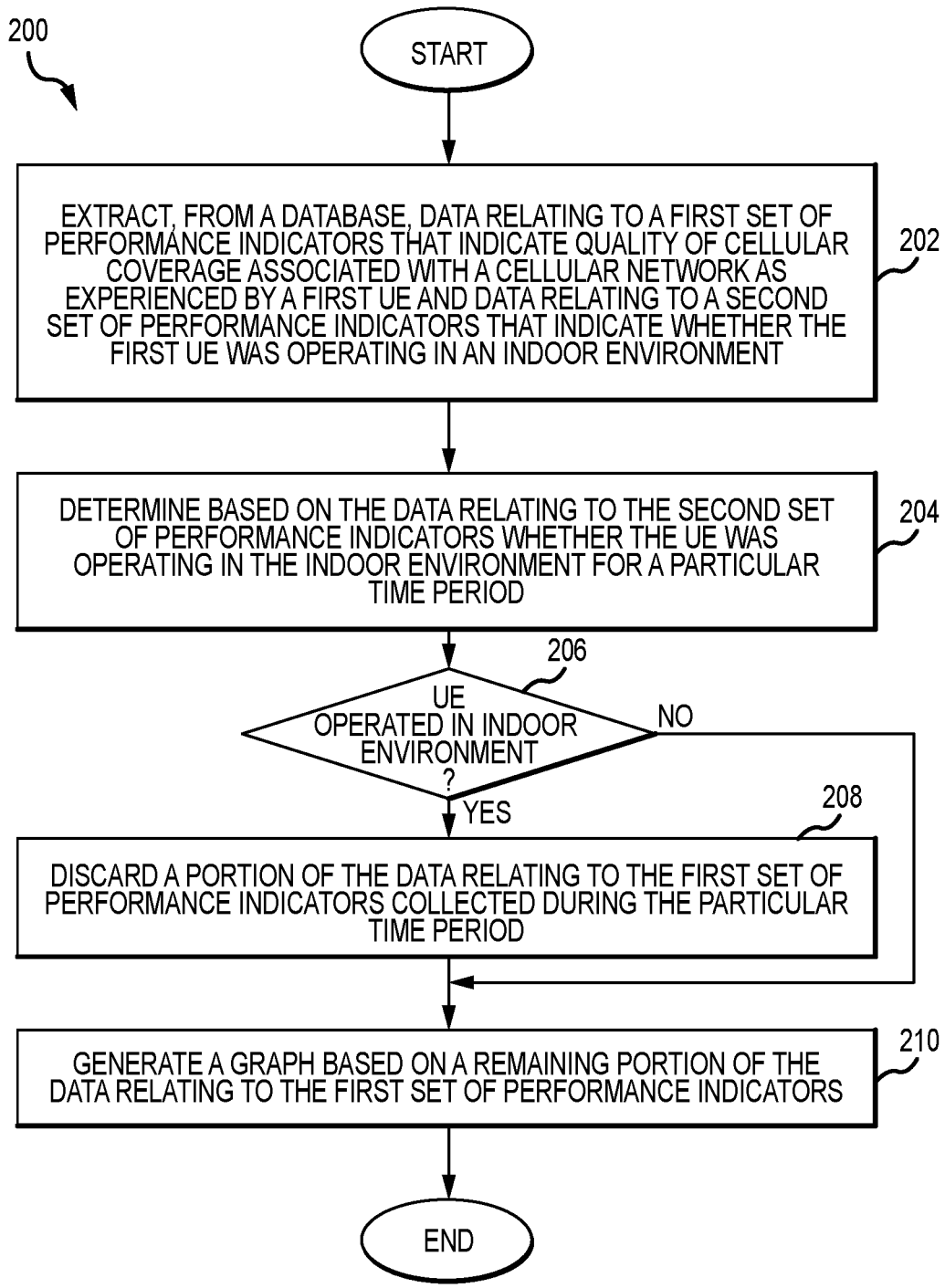
FIG. 2 is a flowchart of an example method for determining quality of a cellular network, in accordance with embodiments of the present disclosure.

FIG. 2 is a flowchart of an example method 200 for determining quality of a cellular network 120, in accordance with embodiments of the present disclosure. Method 200 may be performed by the performance server 170 as shown in FIG. 1 and described above.

At operation 202, the performance server 170 extracts, from the database 152, data relating to a first (e.g., UE 110a). The data extracted from the database 152 includes data relating to a first set of the performance indicators 154 (e.g., network quality indicators 156) that indicate a quality of cellular coverage associated with the cellular network 120 as experienced by the first UE 110a. The data extracted from the database 152 also includes data relating to a second set of the performance indicators 154 (e.g., indoor/outdoor indicators 158) that indicate whether the UE 110a was operating in an indoor environment.

As described above, performance Server 170 may be configured to determine a quality of the cellular network 120 as experienced by a UE 110 (e.g., UE 110a) based on data related to performance indicators 154 collected by the UE 110. For example, performance server 170 may have access to the performance data relating to one or more performance indicators 154 collected using a plurality of UEs 110 such as UE 110a.

A UE 110a (e.g., a smartphone) that is connected to a particular cellular network 120 may be used to collect data associated with a plurality of performance indicators 154, wherein each performance indicator 154 indicates performance of the cellular network 120 directly or indirectly. In one embodiment, a software plug-in 116 is embedded into a mobile application 114 installed at the UE 110a (e.g., a smartphone). The software plug-in 116 is configured to collect data relating to a plurality of performance indicators 154 when the mobile application 114 is active at the UE 110a. For example, the software plug-in 116 initiates collection of performance data related to the performance indicators 154 when the mobile application 114 is opened at the UE 110 and continues to collect performance data while the mobile application 114 is open and is being actively used, for example, by a user 112. The software plug-in 116 may be configured to collect performance data relating a plurality of performance indicators 154 that directly indicate quality of cell coverage associated with the cellular network 120. For example, the performance indicators 154 may include one or more network quality indicators 156 including, but not limited to, Reference Signal Received Power (RSRP), Reference Signal Received Quality (RSRQ), Signal-to-Noise and Interference Ratio (SNIR), downlink speed, and uplink speed.

In an additional or alternative embodiment, the software plug-in 116 may be configured to collect performance data relating a plurality of performance indicators 154 that indirectly indicate quality of cell coverage associated with the cellular network 120. For example, the performance indicators 154 may include one or more indoor/outdoor indicators 158 including, but not limited to, charging indicator 162, Alternative Current (AC)/Direct Current (DC) indicator 164, and light intensity 166. Each of the indicators 162, 164, 166 that are part of the indoor/outdoor indicators 158 indicate, at least in part, whether the UE 110*a* was in an indoor environment or an outdoor environment while data relating to these indicators 162, 164, 166 was collected.

Each UE 110 (e.g., UE 110*a*) that collects data relating to one or more performance indicators 154 for a particular cellular network 120 may be configured to store the collected data in a database 152 (e.g., SQL Database) that is connected to the data network 140. For example, UE 110*a* may be configured to store performance data relating to the performance indicators 154 in the database 152. In one embodiment, the database 152 may be hosted in a cloud service 150 and may be part of cloud storage provided by the cloud service 150.

Performance server 170 may (e.g., periodically or when needed) extract at least a portion of the data related to performance indicators 154 stored in the database 152 from the cloud service 150 and store locally in memory 176. For example, performance server 170 may extract performance data related to one or more performance indicators 154 collected by a particular UE 110*a* and store locally in memory 176. The data relating to the performance indicators 154 access from the database 152 and/or extracted from the database 152 may include data relating to network quality indicators 156 as well as indoor/outdoor indicators 158.

At operation 204, the performance server 170 determines, based on the data relating to the second set of the performance indicators 154 (e.g., indoor/outdoor indicators 158), whether the first UE (e.g., UE 110*a*) was operating in an indoor environment for a particular time period.

As described above, performance server 170 may be configured to determine which portion of the data collected by the UE 110*a* was collected when the UE 110*a* was operating in an indoor environment. For example, performance server 170 may be configured to determine that the UE 110 was operating in an indoor environment for a given time period based on data collected by the UE 110 relating to the indoor/outdoor indicators during the time period. The performance server 170 may be configured to use data relating to one or more of the charging indicator 162, AC/DC indicator 164, and light intensity 166 to determine whether the UE 110*a* was in an indoor environment when the data relating to these indoor/outdoor indicators 158 was collected by the UE 110*a*.

In one embodiment, performance server 170 may be configured to determine that the UE 110 was operating in an indoor environment during a given time period based on data collected by the UE 110 relating to the charging indicator 162 during the given time period. The charging indicator 162 indicates whether the UE 110*a* was being actively charged at any given time instant. For example, during data collection, when the UE 110*a* is not being actively charged (e.g., not receiving electrical power) the charging indicator indicates "not charging". However, when the UE 110*a* is connected to a power source, the charging indicator 162 flips to indicate "charging" and remains in this state until the UE 110*a* is disconnected from the power source and stops received electrical power, in which case the charging indicator 162 flips back to "not charging". To determine whether the UE 110*a* was being charged during the given time period, the performance server 170 examines the state (e.g., charging or not charging) of the charging indicator 162 during the given time period. If the charging indicator 162 indicates "charging" during the given time period, the performance server 170 determines that the UE was being charged during the given time period. In response to determining that the UE 110 was being charged during the given time period, the performance server 170 determines that the UE 110*a* was operating in an indoor environment during the given time period. The idea here is that users generally charge their devices (e.g., smartphone, tablet computer, smartwatches etc.) in an indoor environment such as home and office. Thus, if a UE 110*a* is being charged, there is a good likelihood that the UE 110 is in an indoor environment.

In an additional or alternative embodiment, performance server 170 may be configured to determine that the UE 110 was operating in an indoor environment during a given time period based on data collected by the UE 110 relating to the charging indicator 162 and the AC/DC indicator 164 during the given time period. In this embodiment, the performance server 170 may be configured to determine whether the UE 110 was operating in an indoor environment based on a combination of data relating to the charging indicator 162 and the AC/DC indicator 164 collected during the given time period. For example, in addition to examining the state of the charging indicator 162 during the given time period, the performance server 170 also examines a state of the AC/DC indicator 164 during the given time period. The AC/DC indicator 164 indicates whether the UE 110 received AC power or DC power when charging during a given time period. For example, during data collection, when the UE 110*a* is actively being charged and is receiving AC power, the AC/DC indicator 164 is set to "AC" to indicate that the UE 110*a* is receiving AC power. On the other hand, when the UE 110*a* is receiving DC power, the AC/DC indicator 164 is set to "DC" to indicate that the UE 110*a* is receiving DC power. To determine whether the UE 110*a* was being operated in an indoor environment during the given time period, the performance server 170 checks the states of both the charging indicator 162 and AC/DC indicator during the given time period. In other words, the performance server 170 checks whether the UE 110*a* was being charged during the given time period, and if yes, checks whether the UE as receiving AC power or DC power. The performance server 170 determines that the UE 110*a* was being charged using AC power during the given time period when the charging indicator 162 is set to "charging" and the AC/DC indicator 164 is set to "AC" during the given time period. In response to determining that the UE 110*a* was being charged using AC power during the given time period, the performance server 170 determines that the UE 110a was operating in an indoor environment during the given time period. This embodiment is to account for those cases when the UE 110a is being charged in an outdoor environment and to avoid false positives in such cases. For example, users 112 often charge their devices using portable charging devices such as a power bank. In such cases, the charging indicator 162 alone is not a good indicator of whether the UE 110a was operating in an indoor environment. Portable charging devices typically provide DC power to a UE 110. On the other hand, power socket that are generally provided in indoor environments such as buildings provide AC power. Thus, whether the UE 110a is receiving AC power or DC power is a reasonably reliable indicator of whether the UE 110a is being charged in an indoor environment or an outdoor environment. In other words, when the UE 110a is being charged using AC power, there is a high likelihood that the UE 110a is in an indoor environment. Thus, determining whether the UE 110a was operating in an indoor environment based on a combination of the charging indicator 162 and AC/DC indicator 164 is more accurate that a determination based on charging indicator 162 alone.

In an additional or alternative embodiment, performance server 170 may be configured to determine that the UE 110 was operating in an indoor environment during a given time period based on data collected by the UE 110 relating to the light intensity 166 during the given time period. As described above, a light sensor associated with the UE 110a may be configured to measure the intensity of light in the vicinity of the UE 110a. The amount of light is usually lower in indoor environments as compared to outdoor environments during daytime. Thus, when the light intensity measured by the light sensor associated with the UE 110a is lower than a pre-configured threshold (e.g., during daytime), there is a good likelihood that the UE 110 is in an indoor environment. The performance server 170 may be configured to examine the light intensity 166 measured by the light sensor of the UE 110a (e.g., during daytime) and determines that the UE 110a was operating in an indoor environment during a given time period when the light intensity 166 is below the threshold during the given time period. In response to determining that the light intensity 166 is below the threshold during the given time period, the performance server 170 determines that the UE 110a was operating in an indoor environment during the given time period.

In one embodiment, the data relating to light intensity 166 may be combined with data relating to the charging indicator 162 and/or the AC/DC indicator 164 to raise accuracy associated with determining whether the UE 110a was operating in a indoor environment. For example, the performance server 170 may determine that the UE 110a was operating in an indoor environment during a given time period in response to determining that the charging indicator was set to "charging", the AC/DC indicator 164 was set to "AC", and the light intensity 166 was below the threshold.

At operation 206, upon determining that the first UE (e.g., UE 110a) was not operating in an indoor environment for any length of time, method 200 proceeds to operation 210 described below. On the other hand, upon determining that the first UE (e.g., UE 110a) was operating in an indoor environment during a particular time period, method 200 proceeds to operation 208, where the performance server 170 discards a portion of the data relating to the first set of performance indicators (e.g., network quality indicators 156) collected during the particular time period.

At operation 208, performance server 170 generate a graph 180 based on a remaining portion of the data relating to the first set of performance indicators (e.g., network quality indicators 156) after discarding the portion of the data relating to the first set of performance indicators collected while the UE 110a was operating in an indoor environment. In an embodiment, the graph 180 plots an average value associated with one or more performance indicators (e.g., network quality indicators 156) from the first set to represent a quality of the cellular coverage associated with the cellular network 120 as experienced by the UE 110a.

As described above, performance data collected when the UE 110a is operating in an indoor environment is not a true indicator of network performance at a given location (e.g., geographical location) of the UE 110a where the data was collected. Thus, performance server 170 may be configured to discard data relating to the performance indicators 154 collected by the UE 110a while operating in indoor environments. For example, using the process described above, performance server 170 determines all those time periods when the UE 110a was operating in indoor environments, and discards data relating to the performance indicators 154 collected during all those time periods. In one embodiment, discarding data includes not considering the discarded data to determine quality of the cellular network 120. In one embodiment, in response to determining that the UE 110a was operating in an indoor environment during a given time period, the performance server 170 discards data relating to the network quality indicators 156 collected by the UE 110a during the given time period.

After discarding a portion of the data relating to network quality indicators 156 that was collected by the UE 110a when operating in indoor environments, performance server 170 may be configured to generate a graph 180 based on the remaining data relating to the network quality indicators 156. In one embodiment, the graph 180 plots an average value associated with one or more network quality indicators 156 to visually represent a quality of the cellular coverage associated with the cellular network 120 as experienced by the UE 110a. The performance server 170 may be configured to display the graph 180 on a display device to allow a user 112 to view the graph 180. In one embodiment, performance server 170 may be configured to determine an average values of one or more network quality indicators 156 collected by several UEs 110 connected to the cellular network 120, and plots the average values by region on the graph 180. This provides a better picture of the quality of network coverage associated with the cellular network 120 in different regions, for example, of a city, town, county and/or country. Similarly, the performance indicator may determine separate average values of the network quality indicators 156 collected by UEs 110 connected to different cellular networks, and separately plots the average quality indicators associated with the different cellular networks on the same graph 180. This allows for a comparative analysis different cellular networks. An example graph 180 may include the average values of one or more network quality indicators 156 plotted region wise on a map of a city, state or country. Other examples of the graph 180 may include, but are not limited to, bar graphs, pie charts, area charts, scatter plots, and line graphs.

In an alternative or additional embodiment, the performance server may be configured to determine whether the quality of the cellular network is acceptable in a particular region (e.g., neighborhood, city, town, county etc.) based on data relating to one or more network quality indicators 156 (e.g., after discarding data collected when the was in UE 110a indoor environments). For example, based on data relating to a particular network quality indicator 156 (e.g., RSRP) collected by the UE 110a in a particular neighborhood, the performance server 170 may determine whether an average RSRP over a given time period is below a threshold. If the average RSRP is below the threshold, the performance server 170 determines that the quality of the cellular network 120 in the neighborhood is not acceptable. This may cause the network operator of the cellular network 120 to decide to deploy one or more additional cell sites (e.g., cell towers 122) in the neighborhood to improve quality of cell coverage in the neighborhood.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:
a memory storing data relating to a plurality of performance indicators associated with performance of a cellular network, wherein the data relating to the performance indicators is collected from a plurality of user equipment (UEs) connected to the cellular network;
a processor communicatively coupled to the memory and configured to:
wirelessly receive, using a base station, radio signals from the plurality of UEs, wherein the radio signals comprise the data relating to the plurality of the performance indicators from each of the plurality of UEs;
wherein the data relating to a first UE of the plurality of UEs comprises:
data relating to a first set of the performance indicators that indicate a quality of cellular coverage associated with the cellular network as experienced by the first UE; and
data relating to a second set of the performance indicators that indicate whether the first UE was operating in an indoor environment;
determine based on the data relating to the second set of performance indicators that the first UE was operating in the indoor environment for a particular time period, wherein:
the second set of performance indicators comprises a first parameter indicating whether the first UE is being charged and a second parameter indicating whether the first UE is receiving alternating current (AC) power or direct current (DC) power;
determining whether the first UE was operating in the indoor environment for the particular time period comprises:
determining, based on the first parameter, whether the first UE was being charged during the particular time period;
in response to determining that the first UE was being charged during the particular time period, determine, based on the second parameter, whether the UE received AC power or DC power while being charged during the particular time period; and
in response to determining that the UE was being charged during the first time period and that the UE received AC power during the particular time period, determining that the UE was operating in the indoor environment for the particular time period;
in response to determining that the first UE was operating in the indoor environment for the particular time period, generate an updated first set of the performance indicators after discarding a portion of the data relating to the first set of performance indicators collected during the particular time period;
determine that an average value associated with the one or more performance indicators from the updated first set collected from at least the first UE in a particular neighborhood is below a threshold; and
in response to determining that the average value associated with the one or more performance indicators from the updated first set is below the threshold, determine that one or more cell towers is to be deployed in the particular neighborhood.

2. The system of claim 1, wherein the first set of performance indicators comprises one or more of Reference Signal Received Power (RSRP), Reference Signal Received Quality (RSRQ), Signal-to-Noise Interference Ratio (SNIR), downlink speed, and uplink speed.

3. The system of claim 1, wherein the second set of performance indicators comprises a third parameter indicating an intensity of light measured by a light sensor associated with the first UE.

4. The system of claim 1, wherein the processor is further configured to determine whether the first UE was operating in the indoor environment for the particular time period by:
determining based on the third parameter that the intensity of light measured by the light sensor associated with the first UE was lower than a threshold during the particular time period; and
in response to determining that the first UE was being charged during the first time period, that the first UE received AC power during the particular time period, and that the intensity of light was lower than a threshold during the particular time period, determining that the first UE was operating in the indoor environment for the particular time period.

5. The system of claim 1, wherein the data relating to the plurality of performance indicators associated with performance of a cellular network is collected when a designated mobile application is running at the first UE.

6. The system of claim 1, wherein the processor is further configured to determine whether the quality of the cellular network is acceptable based on the remaining portion of the data relating to the first set of performance indicators.

7. A method for determining quality of a cellular network, comprising:
wirelessly receiving, using a base station, radio signals from a plurality of UEs, wherein the radio signals comprise data relating to a plurality of performance indicators from each of a plurality of UEs;
wherein the data relating to a first UE of the plurality of UEs comprises:
data relating to a first set of the performance indicators that indicate a quality of cellular coverage associated with the cellular network as experienced by the first UE; and
data relating to a second set of the performance indicators that indicate whether the first UE was operating in an indoor environment;
determining based on the data relating to the second set of performance indicators that the first UE was operating in the indoor environment for a particular time period, wherein:
the second set of performance indicators comprises a first parameter indicating whether the first UE is being charged and a second parameter indicating whether the first UE is receiving alternating current (AC) power or direct current (DC) power;
determining whether the first UE was operating in the indoor environment for the particular time period comprises:
determining, based on the first parameter, whether the first UE was being charged during the particular time period;
in response to determining that the first UE was being charged during the particular time period, determine, based on the second parameter, whether the UE received AC power or DC power while being charged during the particular time period; and
in response to determining that the UE was being charged during the first time period and that the UE received AC power during the particular time period, determining that the UE was operating in the indoor environment for the particular time period;
in response to determining that the first UE was operating in the indoor environment for the particular time period, generating an updated first set of the performance indicators after discarding a portion of the data relating to the first set of performance indicators collected during the particular time period;
determining that an average value associated with the one or more performance indicators from the updated first set collected from at least the first UE in a particular neighborhood is below a threshold; and
in response to determining that the average value associated with the one or more performance indicators from the updated first set is below the threshold, determining that one or more cell towers is to be deployed in the particular neighborhood.

8. The method of claim 7, wherein the first set of performance indicators comprises one or more of Reference Signal Received Power (RSRP), Reference Signal Received Quality (RSRQ), Signal-to-Noise Interference Ratio (SNIR), downlink speed, and uplink speed.

9. The method of claim 7, wherein the second set of performance indicators comprises a third parameter indicating an intensity of light measured by a light sensor associated with the first UE.

10. The method of claim 9, wherein determining whether the first UE was operating in the indoor environment for the particular time period comprises:
determining based on the third parameter that the intensity of light measured by the light sensor associated with the first UE was lower than a threshold during the particular time period; and
in response to determining that the first UE was being charged during the first time period, that the first UE received AC power during the particular time period, and that the intensity of light was lower than a threshold during the particular time period, determining that the first UE was operating in the indoor environment for the particular time period.

11. A non-transitory computer-readable medium storing instructions that when executed by a processor causes the processor to:
wirelessly receive, using a base station, radio signals from a plurality of UEs, wherein the radio signals comprise data relating to a plurality of performance indicators from each of a plurality of UEs;
wherein the data relating to a first UE of the plurality of UEs comprises:
data relating to a first set of the performance indicators that indicate a quality of cellular coverage associated with the cellular network as experienced by the first UE; and
data relating to a second set of the performance indicators that indicate whether the first UE was operating in an indoor environment;
determine based on the data relating to the second set of performance indicators that the first UE was operating in the indoor environment for a particular time period, wherein:
the second set of performance indicators comprises a first parameter indicating whether the first UE is being charged and a second parameter indicating whether the first UE is receiving alternating current (AC) power or direct current (DC) power;
determining whether the first UE was operating in the indoor environment for the particular time period comprises:
determining, based on the first parameter, whether the first UE was being charged during the particular time period;
in response to determining that the first UE was being charged during the particular time period, determine, based on the second parameter, whether the UE received AC power or DC power while being charged during the particular time period; and
in response to determining that the UE was being charged during the first time period and that the UE received AC power during the particular time period, determining that the UE was operating in the indoor environment for the particular time period;
in response to determining that the first UE was operating in the indoor environment for the particular time period, generate an updated first set of performance indicators after discarding a portion of the data relating to the first set of performance indicators collected during the particular time period;

determine that an average value associated with the one or more performance indicators from the updated first set collected from at least the first UE in a particular neighborhood is below a threshold; and in response to determining that the average value associated with the one or more performance indicators from the updated first set is below the threshold, determine that one or more cell towers is to be deployed in the particular neighborhood.

12. The non-transitory computer-readable medium of claim 11, wherein the first set of performance indicators comprises one or more of Reference Signal Received Power (RSRP), Reference Signal Received Quality (RSRQ), Signal-to-Noise Interference Ratio (SNIR), downlink speed, and uplink speed.

13. The non-transitory computer-readable medium of claim 11, wherein the second set of performance indicators comprises a third parameter indicating an intensity of light measured by a light sensor associated with the first UE.

14. The non-transitory computer-readable medium of claim 11, wherein determining whether the first UE was operating in the indoor environment for the particular time period comprises:

determining based on the third parameter that the intensity of light measured by the light sensor associated with the first UE was lower than a threshold during the particular time period; and in response to determining that the first UE was being charged during the first time period, that the first UE received AC power during the particular time period, and that the intensity of light was lower than a threshold during the particular time period, determining that the first UE was operating in the indoor environment for the particular time period.

* * * * *